May 7, 1929.  W. J. MORRISEY  1,711,961
MOTOR IGNITION SHIELD FOR AUTOMOBILES
Filed April 4, 1927
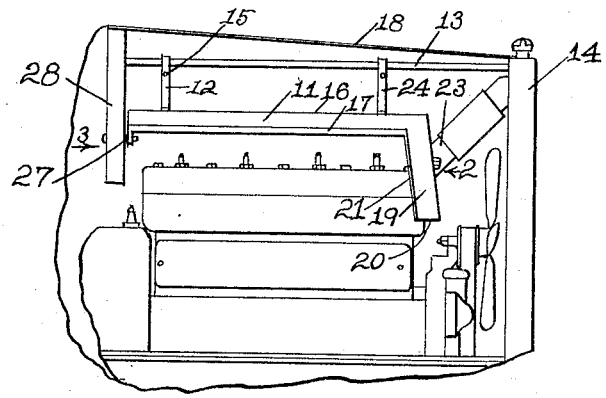
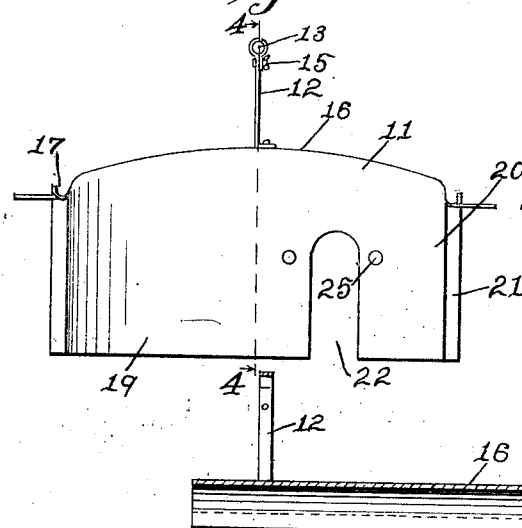
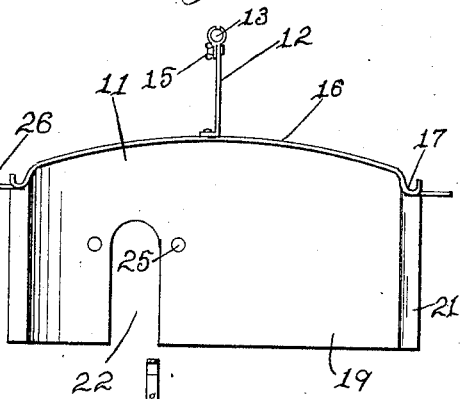
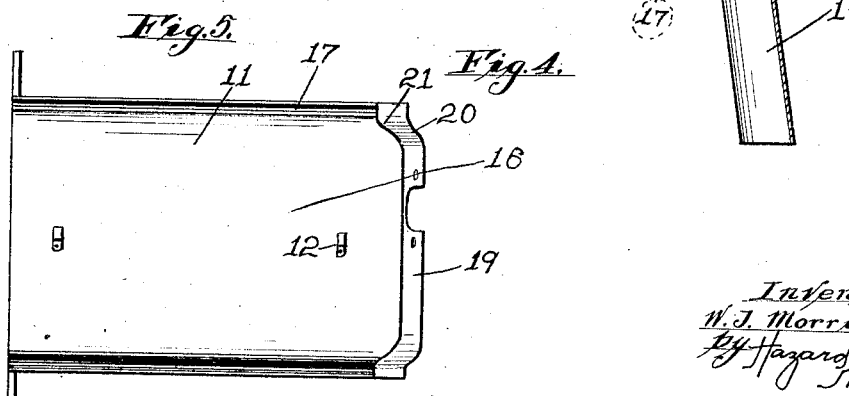
Inventor
W. J. Morrisey
By Hazard and Miller
Attorneys Patented May 7, 1929.

1,711,961

UNITED STATES PATENT OFFICE.

WILLIAM J. MORRISEY, OF LOS ANGELES, CALIFORNIA.

MOTOR-IGNITION SHIELD FOR AUTOMOBILES.

Application filed April 4, 1927. Serial No. 180,829.

My invention is a motor ignition shield for automobiles adapted to prevent the water from dripping through the hood on the ignition wires, spark plugs or the like, of an automobile engine, and to prevent the water driving through the radiator from being blown by the fan on such electrical parts of the engine.

An object of my invention is the construction of a shield to protect the ignition mechanism of an automobile, in particular to protect the spark plugs and the wires leading thereto, from moisture such as rain, or water thrown upwardly by the wheels and passing through the radiator.

A further object of my invention is to construct a shield with a substantially horizontal covered section which is suspended by straps or the like from the brace rod connected between the dash of the automobile and the radiator, this cover having an apron or the equivalent which extends downwardly in front of the engine straddling the hot water conduit from the engine to the radiator, the apron being positioned to prevent water which has passed through the radiator from being blown by the fan on the above mentioned ignition apparatus.

My invention is illustrated in the accompanying drawings, in which:

Figure 1 is a side elevation showing my ignition shield in position to protect the ignition parts of an engine.

Figure 2 is a front elevation of the shield removed from the engine, as if taken in the direction of the arrow 2 of Fig. 1.

Figure 3 is a rear view of the shield removed from the engine, taken in the direction of the arrow 3 of Fig. 1.

Figure 4 is a longitudinal section on the line 4—4 of Fig. 2 in the direction of the arrows, showing the suspending straps in elevation.

Figure 5 is a plan view of the shield removed from the engine.

The shield is provided with a cover plate 11 which extends over the engine transversely and longitudinally, this cover having a pair of straps 12 fixedly attached thereto, these straps engaging over a brace rod 13 which connects the radiator 14 to the dash structure of the car. The straps have a clamp nut 15 which allows the ready attachment to such bar. It will be noted that the top of the cover is curved convexly on the upper part, as indicated by the numeral 16, and is substantially horizontal, having troughs 17 on each side to catch any water which may fall on the cover. This water is practically only that amount which passes through the hinge of the hood 18.

An apron 19 is connected to the forward part of the cover plate and extends downwardly with a slightly forward inclination, as shown in Figs. 1 and 4. This apron is curved transversely of the engine at the sides, having outwardly convexed corners 20 and with laterally extending flanges 21. The apron is provided with a cut out slot 22 through which passes the water pipe 23 conveying hot water from the engine block to the radiator.

The shield may be slightly tilted, either with a slope towards the rear or towards the front, so that the water which catches in the troughs 17 may flow either direction. It is preferable to have it tilted slightly towards the rear so that the motion of the air underneath the hood and especially as driven by the fan will drive the water towards the rear part of the trough, such water dripping off at the sides of the cover and the rear of the engine where it can do no harm.

The manner of functioning of my ignition shield is substantially as follows:

When the roads are wet, particularly with water puddles, a great deal of difficulty is experienced by motorists with the water thrown upwardly by the front wheels passing through the radiator and being blown by the fan over the ignition apparatus. When my shield is installed, such water is caught by the apron 19 and drips downwardly below the spark plug and the wires connected thereto where it can do no harm, the water dripping from the engine to the ground. Any water which strikes the cover plate 16 is carried by the troughs 17, preferably to the rear end of such plate, and drips off such plate at opposite sides and rearwardly of the engine block and thus cannot affect the ignition apparatus. It is to be noted that with my construction the cover plate may be adjusted at different elevations in regard to the brace rod 13 by means of the apertures 24 in the straps and the apron can be securely fastened to the water pipe 23 by bolting through the perforations 25 in the apron. Thus the device is held rigidly in position in relation to the engine. The shield may be adjusted so as to give plenty of room for removing and inserting the spark plugs and for handling the ignition wires. Therefore, the shield forms practically no inconvenience in handling such parts of the vehicle and is readily detachable if the cylinder heads require removing.

On the rear end of the cover 16 I provide a pair of fingers 26 which extend laterally beyond the sides of the trough, as clearly illustrated in Figs. 2, 3 and 5. These fingers may be bent around a bolt 27 which is secured to a framing member 28 on the cowl of the automobile. By this construction the rear end of the shield is held firmly in position whereas the main weight of the shield is suspended by the straps 24 and the front end is held rigidly in position by means of the bolts through the perforations 25.

Various changes may be made in the principles of my invention without departing from the spirit thereof, as set forth in the description, drawings and claim.

I claim:

A motor ignition shield comprising in combination a cover plate, means to support said plate in a substantially horizontal position above an engine block, an apron connected to the forward end of the plate and extending downwardly in front of the block, said plate having a cut out slot to accommodate a water pipe from the engine block to a radiator, fingers extending laterally from the rear end of the cover plate, said fingers being adapted to bend around a supporting element on a fixed structure of the automobile.

In testimony whereof I have signed my name to this specification.

WILLIAM J. MORRISEY.